INVENTORS
Robert W. Haisty &
John W. Ross
BY Stevens, Davis, Miller & Mosher
ATTORNEYS United States Patent Office 3,197,942
Patented Aug. 3, 1965

3,197,942
METHOD FOR REMOVAL OF HYDROGEN
HALIDE FROM A PROCESS STREAM
Robert W. Haisty, Richardson, Tex., and John W. Ross, Cumberland, R.I., assignors to Texas Instruments Incorporated, Dallas, Tex., a corporation of Delaware
Continuation of application Ser. No. 831,966, Aug. 6, 1959. This application Apr. 7, 1964, Ser. No. 359,545
9 Claims. (Cl. 55—71)

This application is a continuation of our earlier filed copending application Serial No. 831,966, filed August 6, 1959, now abandoned, and entitled "Method for Removal of Hydrogen Halide From a Process Stream."

This invention relates to the selective adsorption of hydrogen halide from a process stream and more particularly to a method for removal of hydrogen chloride from a process exhaust stream of a hydrogen reduction reaction to enable recycling the unused hydrogen and other reactants for reuse in a continuous reduction process.

The invention will be described with particular reference to the reduction of trichlorosilane to high purity silicon suitable for use in producing transistors, but it should be understood that the invention is not limited to such use.

The reduction reaction of trichlorosilane with hydrogen takes place in a quartz tube at a temperature of about 1250° C. The process stream as exhausted from the quartz tube includes unreacted hydrogen, trichlorosilane, and hydrogen chloride. Removal of hydrogen chloride is necessary before recycling the unreacted components plus make-up gas.

Accordingly, it is a primary object of the invention to provide a method of selectively removing hydrogen chloride from a process stream and especially a process exhaust stream taken from a hydrogen reduction reaction to enable the process stream to be recycled in a continuous, efficient and less costly manner.

Another object of the invention is to provide a method of removing hydrogen chloride from a gas stream which utilizes an efficient adsorbent stable to attack by hydrogen chloride and which may be easily regenerated or reconstituted by desorption, thereby permitting repeated adsorption-desorption cycles and efficient reuse of the adsorbent.

A still further object of the invention is to provide a method of removing hydrogen chloride from a gas stream which utilizes an adsorbent of large capacity and capable of regeneration for reuse by simply heating under vacuum.

Yet another object of the invention is to provide a method of removing hydrogen chloride from a gas stream which utilizes an adsorbent capable of regeneration for reuse by heating and purging with a nonreactive gas (inert with respect to the adsorbent). Examples of a suitable gas would include hydrogen, nitrogen, and air. These are the most economically feasible. Others, less practical from a cost standpoint, would include helium, neon, argon and in fact any non-reactive gas.

The novel features that are considered characteristic of the invention are set forth with particularity in the appended claims. The invention itself, however, both as to its organization and its method of operation, together with additional objects and advantages thereof, will best be understood from the following description of the best mode for carrying out the invention and specific embodiments of the same when read in connection with the accompanying drawings, wherein like reference characters indicate like parts throughout the several figures and in which:

Figure 1:
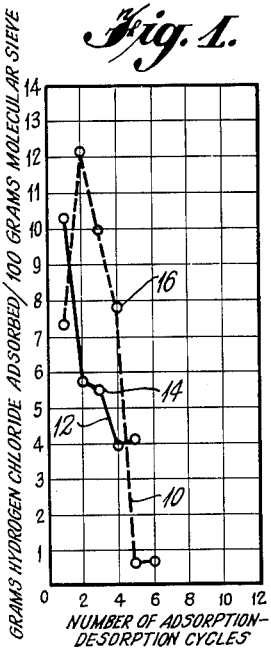
FIGURE 1 is a chart illustrating the effect upon the adsorptive capacity of heating synthetic zeolite molecular sieves, both modified and unmodified, in an atmosphere of hydrogen chloride.

Again referring to the previously described production of pure silicon by hydrogen reduction of trichlorosilane, the method of the present invention comprises the insertion of a suitable adsorbent in the path of the exhaust gases issuing from the quartz tube reactor to remove selectively the hydrogen chloride from unused hydrogen and trichlorosilane. These unused reactants are then fed to a second quartz tube reactor, or recycled into the first reactor, with or without make-up gas. The silicon obtained in the reaction is sufficiently pure for semiconductor devices or can be further refined by any suitable technique as by zone refining. A continuous production process is maintained by periodically removing the adsorbent material with substitution of fresh adsorbent, regenerating the saturated material by heating in a vacuum or otherwise, and purging with a nonreactive gas and reinserting the regenerated adsorbent in the exhaust stream of the reactor.

A suitable adsorbent for use in the described process was extremely difficult to discover. The common adsorbents lack adequate adsorptive capacity at room temperature, are unstable at high temperatures, are subject to modification by HCl, or cannot be regenerated easily or frequently for reuse. These difficulties, to a certain extent, are experienced also by a relatively new synthetic zeolite, Type A, marketed by the Linde Air Products Co., under the name "Linde Molecular Sieve, Types 4A and 5A." The new zeolite is identified as zeolite A, and is described in detail in U.S. Patent No. 2,882,243, issued April 14, 1959. The structure of the zeolite is a three-dimensional network of alternating $AlO_4$ and $SiO_4$ tetrahedra, 12 of each per unit cell. Interstices are occupied by 12 sodium ions and 27 molecules of water. The crystal unit cell provides a large central cavity 11.4 A. in diameter which is connected to six like cavities by restricted openings 4.2 A. in diameter. In additon, a second pore system is provided by 11.4 A. cavities alternating with 6.6 A. cavities separated by 2.0 A. restrictions. While this zeolite structure is suitable for adsorption of hydrogen chloride and exclusion of trichlorosilane, it is not stable to attack by the HCl at high temperature. Hot concenrtated hydrochloric acid dissolves the zeolite in 20 to 30 minutes, with the formation of a gel. However, it was found that the Linde Molecular Sieves may be modified by ion exchange using zinc, calcium, and magnesium compounds to yield adsorbents entirely satisfactory for use in this invention.

As an example, modification of the Linde Molecular Sieve, Type 5A, was accomplished by soaking the sieve in a 12½% aqueous solution of zinc chloride at room temperature for 24 hours. The product formed was much more stable to attack by hydrogen chloride, both aqueous and anhydrous, than the original sieve. The zinc chloride treated sieve was heated for a period of up to two days in concentrated hydrochloric acid, during which time only a slight amount of dissolution and erosion occurred in contrast to the complete dissolution of the original material in 30 minutes. The zeolite pellets remained intact and, after washing in distilled water until it tested negative for chloride ion and drying at 420° C., the pellets had a capacity for adsorbing 4.5 grams of HCl per 100 grams molecular sieve. Results with the zinc chloride-treated type 4A Linde Molecular Sieves were similar.

Referring now to the drawings, FIGURE 1 illustrates the effect of subjecting modified (solid line) and unmodified (broken line) Type 5A Molecular Sieves to alternate adsorption and desorption of hydrogen chloride. The first three cycles were carried out by saturating the sieves with HCl at room temperature and regenerating under a vacuum at 300° C. Points 14 and 16 on FIGURE 1 refer to a change in procedure. At points 14 and 16, the sieves were saturated with HCl at room temperature, evacuated at room temperature, sealed off and heated to 300° C. for 20 minutes. The HCl pressure rose to about 580 mm. of Hg. Subsequent desorption processes were carried out in the original manner by purging with hydrogen followed by evacuation. It is apparent from the chart that the Linde Molecular Sieve Type 5A, curve 10, at first rises in HCl adsorptive capacity, but then begins to decrease in capacity and after contact with HCl at 300° C., loses essentially all of its adsorptive capacity. The zinc chloride treated sieve, curve 12, however, while decreasing somewhat in adsorptive capacity after six regenerative cycles retains a capacity in excess of 4 grams HCl per 100 grams molecular sieve and the adsorption capacity was not appreciably affected by the 300° C. contact with HCl.

The modified form is also stable at higher temperatures than the original Type 5A Molecular Sieve which, after having been heated to 800° C., had a capacity for adsorbing HCl of only 1.48 grams per 100 grams molecular sieve. The zinc chloride treated molecular sieve (5A) was tested for eight HCl adsorption-desorption cycles in which the desorption was done at 800° C. The maximum capacity found was 8.1 grams HCl per 100 grams molecular sieve, and the capacity after eight cycles was 5.3 grams HCl per 100 grams molecular sieve.

Figure 2:
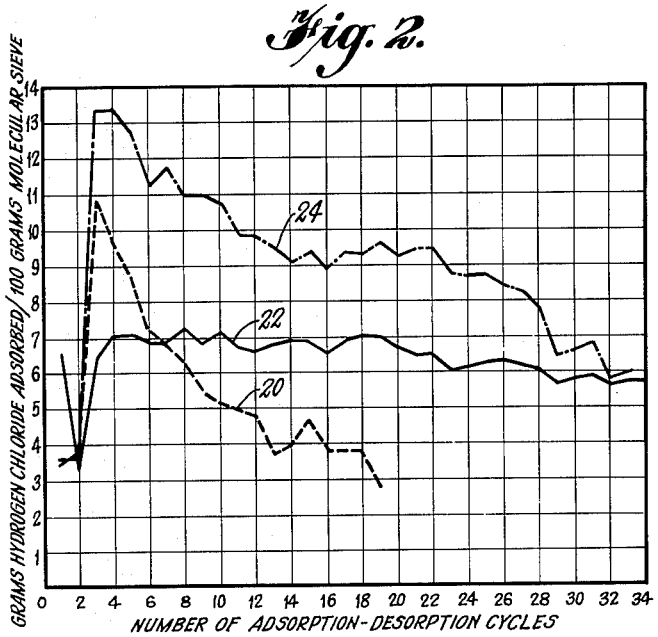
FIGURE 2 is a chart illustrating the static adsorption of HCl by modified and unmodified Type 5A Linde Molecular Sieves under conditions of repeated adsorption-desorption cycles.
Figure 3:
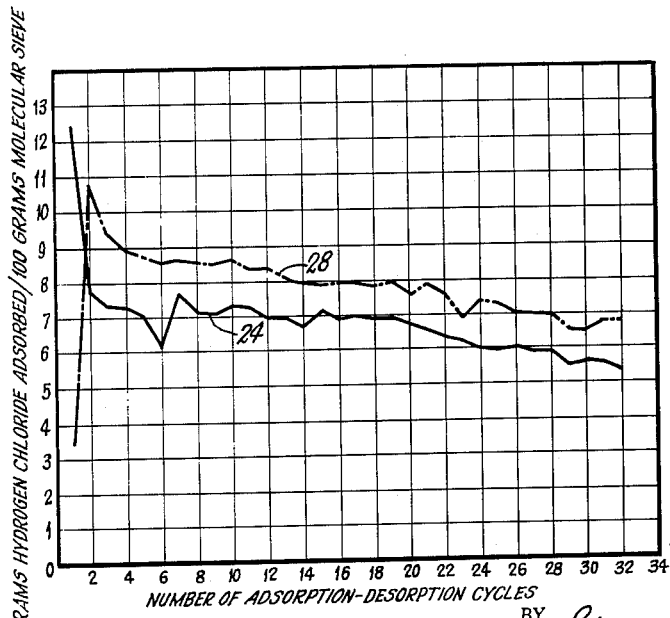
FIGURE 3 is a chart similar to FIGURE 2 but illustrating the effect on adsorption capacity of modifying Type 4A Linde Molecular Sieves.

FIGURES 2 and 3 illustrate the static adsorption of hydrogen chloride on modified Linde Molecular Sieves, Types 5A and 4A, respectively, after many repeated adsorption-desorption cycles. In each case, the hydrogen chloride pressure was 60 cm. of Hg and the adsorption temperature was maintained at 30° C. Desorption in each cycle was by evacuation at 420° C. Curve 20 illustrates that the Type 5A Linde Molecular Sieve loses its adsorptive capacity quickly as compared to a zinc chloride treated sieve, curve 22, which retains high adsorptive capacity even after thirty repeated regenerative cycles. The capacity of the Type 5A sieve is considerably increased by a soaking treatment with an aqueous calcium chloride solution (followed by washing with $H_2O$); see curve 24. Similar results are obtained in the repetitive adsorption-desorption cycling of zinc and calcium exchanged Type 4A Linde Molecular Sieves, see curves 24 and 28, respectively, of FIGURE 3.

The described properties of zinc and calcium exchanged Linde Molecular Sieves, including resistance to attack by hydrochloric acid, good selectivity for hydrogen halides, stability at high temperature and retention of adsorptive capacity after many repeated regenerative cycles make these modified sieves admirably suited for use as an adsorbent in the method of the instant invention. This is particularly so because of the simplicity of the modification which involves merely soaking a sieve in an aqueous zinc, calcium, or magnesium salt solution followed by washing in $H_2O$. The modified sieves are then inserted in the exhaust gas stream of the hydrogen reduction reactor to efficiently adsorb the hydrogen chloride without adsorbing the unused hydrogen and metallic chloride which are recycled to the reactor or to a second reactor in the continuous reduction process. When the adsorbent sieves are saturated with hydrogen chloride, fresh sieves are substituted, and the used sieves regenerated by heating under vacuum, heating while purging with an inert gas, or by a combination of these operations. After regeneration, the sieves are, of course, available for reuse in the reduction process by reinsertion in the exhaust gas stream.

Table I shown below illustrates the effect of varying $CaCl_2$ concentration and soaking time on HCl adsorbing capacity of Linde Type 4A Molecular Sieve.

*Table I*

[Effect of $CaCl_2$ concentration and soaking time on HCl adsorbing property of Linde Type 4A Molecular Sieve]

| Concentration of $CaCl_2$, wt. percent [1] | Soaking time, hours | Capacity for HCl after 9 cycles, wt. percent |
|---|---|---|
| 6¼ | 6 | 8.0 |
|  | 12 | 8.7 |
|  | 24 | 9.4 |
|  | 48 | 9.0 |
|  | 96 | 8.7 |
|  | 144 | 8.6 |
| 12½ | 6 | 8.4 |
|  | 12 | 8.6 |
|  | 24 | 8.4 |
|  | 48 | 8.7 |
|  | 96 | 8.1 |
|  | 144 | 8.5 |
| 25 | 6 | 8.0 |
|  | 12 | 8.6 |
|  | 24 | 7.7 |
|  | 48 | 8.8 |
|  | 96 | 8.7 |
|  | 144 | 8.5 |
| 50 | 6 | 6.2 |
|  | 12 | (²) |
|  | 24 | 6.7 |
|  | 48 | 7.4 |
|  | 96 | 7.6 |
|  | 144 | 7.7 |

[1] Volume of $CaCl_2$ solution used is 50 grams $CaCl_2$ per 10 grams Molecular Sieve at each concentration.
[2] Lost sample.

Table II illustrates similar data with regard to $ZnCl_2$.

*Table II*

[Effect of $ZnCl_2$ concentration and soaking time on HCl adsorbing property of Linde Type 5A Molecular Sieve]

| Concentration of $ZnCl_2$, wt. percent [1] | Soaking time, hours | Capacity for HCl after 9 cycles, wt. percent |
|---|---|---|
| 6¼ | 12 | 7.9 |
|  | 24 | 7.4 |
|  | 48 | 4.4 |
|  | 72 | 4.8 |
|  | 120 | 4.9 |
|  | 240 | 4.9 |
|  | 480 | 4.6 |
| 12½ | 12 | 6.4 |
|  | 24 | 5.9 |
|  | 48 | 5.2 |
|  | 72 | 4.6 |
|  | 120 | 4.7 |
|  | 240 | 4.4 |
|  | 480 | 3.4 |
| 25 | 12 | 6.7 |
|  | 24 | 5.6 |
|  | 48 | 5.0 |
|  | 72 | 5.0 |
|  | 120 | 4.7 |
|  | 240 | 4.5 |
|  | 480 | 2.6 |
| 50 | 12 | 8.2 |
|  | 24 | 7.3 |
|  | 48 | 5.8 |
|  | 72 | 5.2 |
|  | 120 | 4.5 |
|  | 240 | 4.2 |
|  | 480 | 2.6 |

[1] Volume of $ZnCl_2$ solution used is 50 grams $ZnCl_2$ per 10 grams Molecular Sieve at each concentration.

The process of the invention, as described in detail above, was used in the production of silicon. The element was derived from trichlorosilane in a reduction reaction with hydrogen using a quartz tube as a reactor. Elemental silicon deposited on the quartz tube and $H_2$, HCl, and unused trichlorosilane exited from the tube. A $ZnCl_2$ modified Linde Type 5A Molecular Sieve was interposed in the spent process stream exiting from the quartz tube and served to adsorb HCl out of the spent process stream. The gas stream issuing from the sieve, plus make-up was recycled to the quartz tube.

The sieve (55 pounds) was contained in an 8 foot, Type 316 stainless steel column of 6⅝ inch diameter. This quantity of sieve is sufficient for a four-hour run, based on an adsorption capacity of 6% HCl by weight.

Four actual runs were made. N-type silicon was obtained in each case. Resistivity of the silicon obtained was about 5 ohm centimeters.

There now follows a summary of dynamic stability tests performed on a calcium chloride treated Linde Type 4A Molecular Sieve.

Preparation of sieve: 750 grams of Linde Type 4A Molecular Sieve were soaked for 108 hours (4½ days) in an aqueous solution of 10% calcium chloride by weight. The sieve was then washed until the washings were chloride free, and dried at 420° C. under vacuum in a 2 inch diameter stainless steel column in which the adsorption runs were also made.

Initial HCl adsorption-desorption cycles: The first 24 cycles were made with adsorption at room temperature and a pressure in the column of about one p.s.i.g. The initial capacity for HCl (9.7% by weight) dropped to an average of about 8.5% for the first 24 cycles. Desorption was carried out by heating to 420° C. in a hydrogen purge stream. The 25th adsorption was carried out at a pressure of about 16 p.s.i.g. in the column (the gas stream used in all cases was 4% (mol) HCl—96% (mol) $H_2$) to test the stability of the calcium chloride treated molecular sieve at a higher pressure.

Results of pressure test: The next 19 adsorption cycles, after the run at high pressure, showed an average capacity of 7.5%, which is about what follows from extrapolating the decrease in capacity with use at low pressure; thus, the material appeared to be stable at least up to the pressure of about 16 p.s.i.g. Desorption was conducted as noted previously.

Stability at high adsorption temperature: Beginning with adsorption number 45 (45th cycle) the sieve was subjected to adsorption cycles at ambient temperatures between 50° C. and 350° C., each high temperature adsorption being followed by the usual regeneration (desorption) at 420° C. in a hydrogen stream, and then an adsorption at room temperature, followed by regeneration, before the next high temperature adsorption. The results, summarized in Table III below, show that the treated molecular sieve is stable up to at least 350° C. in hydrogen chloride.

It is also apparent that this treated molecular sieve has sufficient capacity for practical application at ambient temperatures to at least 250° C.

Table III

[Effect of high temperature on stability and capacity for HCl adsorption on calcium chloride treated molecular sieve]

| Adsorption number | Temperature during adsorption | HCl adsorbed, wt. percent |
|---|---|---|
| 44 | Room | 7.26 |
| 45 | 50° C. | 7.55 |
| 46 | Room | 6.91 |
| 47 | 100° C. | 6.18 |
| 48 | Room | 7.42 |
| 49 | 150° C. | 5.29 |
| 50 | Room | 7.25 |
| 51 | 200° C. | 3.08 |
| 52 | Room | 6.80 |
| 53 | 250° C. | 2.75 |
| 54 | Room | 7.73 |
| 55 | 300° C. | 2.02 |
| 56 | Room | 6.51 |
| 57 | 350° C. | 1.72 |
| 58 | Room | 6.66 |
| 59 | Room | 6.81 |
| 60 | Room | 7.19 |
| 61 | Room | 6.93 |
| 62 | Room | 7.00 |

Regeneration in an air stream: Beginning with adsorption number 69 (69th cycle) the regeneration (desorption) was done at 420° C. in a stream of dry air instead of hydrogen. The results, summarized in Table IV below, show that dry air is a suitable purge gas.

Table IV

[Regeneration with dry air (20 liter/min.)]

| Adsorption number | Regeneration purge gas | HCl adsorbed, wt. percent |
|---|---|---|
| 65 | Hydrogen | 6.28 |
| 66 | Hydrogen | 6.62 |
| 67 | Hydrogen | 6.60 |
| 68 | Hydrogen | 6.34 |
| 69 | Dry air | 6.19 |
| 70 | Dry air | 5.92 |
| 71 | Dry air | 6.19 |
| 72 | Dry air | 5.82 |
| 73 | Dry air | 5.80 |
| 74 | Dry air | 5.80 |
| 75 | Dry air | 5.80 |
| 76 | Dry air | 5.80 |
| 77 | Dry air | 5.80 |
| 78 | Dry air | 5.80 |
| 79 | Dry air | 5.80 |
| 80 | Dry air | 5.80 |
| 81 | Dry air | 5.80 |
| 82 | Dry air | 5.80 |
| 83 | Dry air | 5.80 |
| 84 | Dry air | 5.80 |
| 85 | Dry air | 5.80 |
| 86 | Dry air | 5.80 |
| 87 | Dry air | 5.80 |
| 88 | Dry air | 5.80 |
| 89 | Dry air | 5.80 |
| 90 | Dry air | 5.80 |
| 91 | Dry air | 5.80 |
| 92 | Dry air | 5.80 |
| 93 | Dry air | 4.80 |

In summary, one and the same sample of molecular sieve, treated in the manner described above, with calcium chloride, withstood 93 adsorption-desorption cycles of HCl under various adverse conditions. The experiment was discontinued after 93 cycles, since this was considered sufficient proof of stability.

In addition to the improvements noted above concerning the properties of treated sieve material especially as regards adsorption capacity, the selectivity of the treated sieve material for hydrogen halide was found to be excellent.

To test selectivity, a hydrogen stream containing 3.5% HCl was passed through sieve material, treated in accordance with this invention, at the rate of 1.44 liters per minute. A weight increase of 6% was noted for the sieve. A comparable stream of hydrogen containing 3% trichlorosilane was passed through identically prepared sieve material at substantially the same rate and for the same period and a weight increase of 1.05% was noted for the sieve.

If it is assumed that the entire weight gain in each case is due to adsorption of HCl or $SiHCl_3$, then the mol adsorption factor $$\left(\frac{\text{mols of HCl}}{\text{mols of SiHCl}_3}\right)$$

for the data obtained is 21.2 assuming a molecular weight of 36.5 for HCl and 135.4 for $SiHCl_3$.

Applying this data by extension to the reduction of $SiHCl_3$ using hydrogen and passing the reduction products ($H_2$, HCl, and unreduced $SiHCl_3$) through a sieve prepared in accordance with the present invention, the excellent selectivity of the prepared sieve for HCl can be demonstrated. The reaction is described briefly in the foregoing text and may be further illustrated by the following reaction.

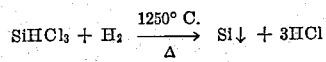

If a yield of 25% silicon is assumed, the following data applies per mol of $SiHCl_3$. The reduction products issuing from the quartz reactor will contain 0.75 mol of unreacted $SiHCl_3$ (for each mol of $SiHCl_3$ feed), 0.75 mol of HCl (formation of HCl at a ratio of 3 mols per 1 (reacting) mol of $SiHCl_3$—0.25 mol $SiHCl_3$ reacted forms 0.75 mol HCl) and $H_2$ which serves as the carrier gas and reactant. Calculating on the basis of complete adsorption of 0.75 mol of HCl, the adsorption of $SiHCl_3$ can be computed using the mol adsorption factor which was previously determined as 21.2.

$$\frac{0.75 \text{ mol of HCl}}{21.2\left(\frac{\text{mols of HCl}}{\text{mols of SiHCl}_3}\right)} = 0.0354 \text{ mol of } SiHCl^3$$

This means that less than about 4.75% of the $SiHCl_3$ was adsorbed by the prepared sieve from the reduction products stream.

Although the above data and calculations demonstrate the excellent selectivity of sieves prepared in accordance with the present invention, it will be appreciated that many factors have been ignored, all of which would make for an even better showing. Such factors as adsorbed water and surface phenomena account for some of the weight gain of the sieve material. It is believed that could a careful quantitative study be completed, it would show that the actual percent $SiHCl_3$ adsorbed is substantially less than 4.75% and probably not greater than about 1 or 2%.

In conclusion, the process of the present invention produced a substantially improved sieve by treating the synthetic zeolite material with an aqueous solution of zinc, calcium or magnesium salt, and in particular a chloride. The concentration (by weight) of the salt can be as dilute or as concentrated as desired. The optimum range of concentration was found to be from about 6% to about 50% by weight. The soaking time also can vary widely. The optimum range in this instance was found to be from about six hours to about 500 hours. The washing after soaking is for the purpose of removing excess chloride and, hence, was usually carried out using distilled water until it tested negative for chloride ion.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A method of efficiently removing hydrogen halide from a process stream consisting essentially of hydrogen halide and a substantially unadsorbable carrier gas, which comprises the steps of modifying a synthetic zeolite selected from the group consisting of Type 4A and Type 5A Molecular Sieves by ion exchange using calcium ions, and thereafter passing the process stream through the modified sieve at a temperature from about 30° C. to about 350° C.

2. A method of efficiently removing hydrogen halide from a process stream consisting essentially of hydrogen halide and a substantially unadsorbable carrier gas, which comprises the steps of modifying a synthetic zeolite selected from the group consisting of Type 4A and Type 5A Molecular Sieves by ion exchange using zinc ions, and thereafter passing the process stream through the modified sieve at a temperature from about 30° C. to about 350° C.

3. A method of efficiently removing hydrogen halide from a process stream consisting essentially of hydrogen halide and a substantially unadsorbable carrier gas, which comprises the steps of modifying a synthetic zeolite selected from the group consisting of Type 4A and Type 5A Molecular Sieves by ion exchange using calcium ions, passing the process stream through the modified sieve at a temperature from about 30° C. to about 350° C., and thereafter regenerating the modified molecular sieve for effective repeated use by heating said sieve.

4. A method of efficiently removing hydrogen halide from a process stream consisting essentially of hydrogen halide and a substantially unadsorbable carrier gas, which comprises the steps of modifying a synthetic zeolite selected from the group consisting of Type 4A and Type 5A Molecular Sieves by ion exchange using zinc ions, passing the process stream through the modified sieve at a temperature from about 30° C. to about 350° C., and thereafter regenerating the modified molecular sieve for effective repeated use by heating said sieve.

5. The method of efficiently removing hydrogen halide from a process stream consisting essentially of hydrogen halide and a substantially unadsorbable carrier gas, which comprises the steps of modifying a synthetic zeolite selected from the group consisting of Type 4A and Type 5A Molecular Sieves by ion exchange using calcium ions, passing the process stream through the modified sieve, and thereafter regenerating the modified molecular sieve by heating said sieve from about 300° C. to about 800° C.

6. The method of efficiently removing hydrogen halide from a process stream consisting essentially of hydrogen halide and a substantially unadsorbable carrier gas, which comprises the steps of modifying a synthetic zeolite selected from the group consisting of Type 4A and Type 5A Molecular Sieves by ion exchange using zinc ions, passing the process stream through the modified sieve, and thereafter regenerating the modified molecular sieve by heating said sieve from about 300° C. to about 800° C.

7. A method of efficiently removing the hydrogen halide reaction product resulting from the hydrogen reduction of a halosilane to silicon which comprises the steps of modifying a synthetic zeolite selected from the group consisting of Type 4A and Type 5A Molecular sieves by ion exchange using calcium ions, passing a heated process stream comprised of halosilane and hydrogen through a reaction zone, removing from the reaction zone a spent process stream comprised of halosilane, hydrogen and hydrogen halide, passing said spent process stream through the modified molecular sieve at a temperature from about 30° C. to about 350° C. to remove selectively hydrogen halide, and thereafter regenerating the modified molecular sieve by heating said molecular sieve from about 300° C. to about 800° C.

8. A method of efficiently removing the hydrogen halide reaction product resulting from the hydrogen reduction of a halosilane to silicon which comprises the steps of modifying a synthetic zeolite selected from the group consisting of Type 4A and Type 5A Molecular Sieves by ion exchange using zinc ions, passing a heated process stream comprised of halosilane and hydrogen through a reaction zone, removing from the reaction zone a spent process stream comprised of halosilane, hydrogen and hydrogen halide, passing said spent process stream through the modified molecular sieve at a temperature from about 30° C. to about 350° C. to remove selectively hydrogen halide, and thereafter regenerating the modified molecular sieve by heating said molecular sieve from about 300° C. to about 800° C.

9. A method of efficiently removing hydrogen halide from a process stream consisting essentially of hydrogen halide and a substantially unadsorbablbe carrier gas, which comprises the steps of:

(a) soaking a synthetic zeolite selected from the group consisting of Type 4A and Type 5A Molecular Sieves in an aqueous solution of about 12½% zinc chloride;

(b) removing chloride ions from said synthetic zeolite by washing in distilled water;

(c) drying said synthetic zeolite; and (d) passing the process stream through the synthetic zeolite at a temperature from about 30° C. to about 350° C.

References Cited by the Examiner

UNITED STATES PATENTS

| | | | |
|---|---|---|---|
| 2,882,243 | 4/59 | Milton | 252—455 |
| 3,029,575 | 4/62 | Eng. et al. | 55—62 |
| 3,030,181 | 4/62 | Milton | 23—113 |
| 3,140,934 | 7/64 | Mandell et al. | 55—71 |

OTHER REFERENCES

"Sorption by Gmelinite and Mordenite," by R. M. Barrer, Transactions of Faraday Society, volume 40, 1944, pages 555–564.

Barrer article, J. Soc. Chem. Ind., vol. 64, 5/45, pp. 130–135.

Breck et al.: article, J. of Am. Chem. Soc., vol. 78, No. 23, Dec. 8, 1956, pp. 5963–5971.

REUBEN FRIEDMAN, *Primary Examiner*.